Jan. 19, 1943.                M. S. CLARK                 2,308,860
              MEANS OF DRILLING ROCK, CONCRETE, AND THE LIKE
                          Filed Nov. 23, 1940
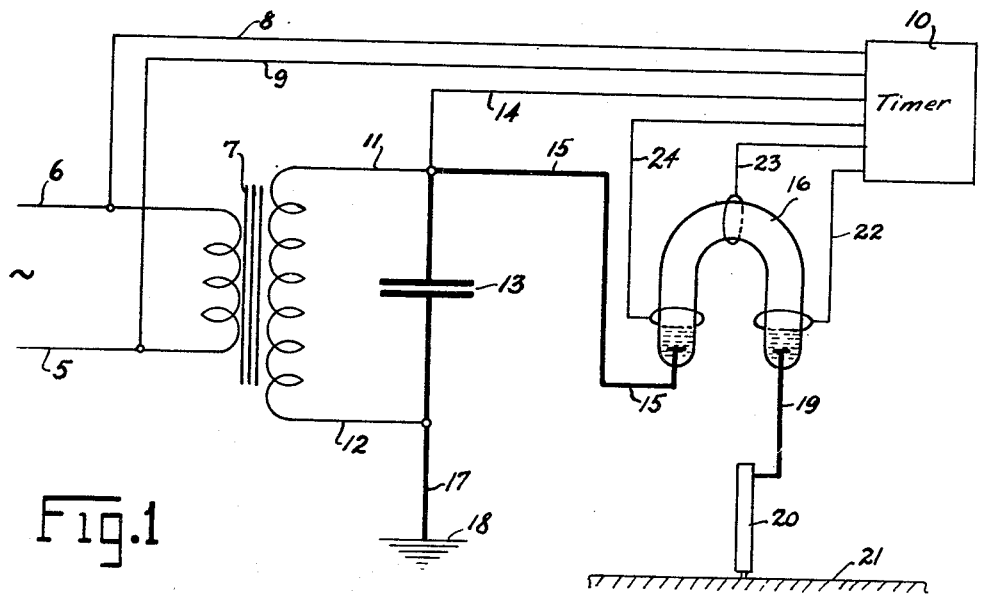
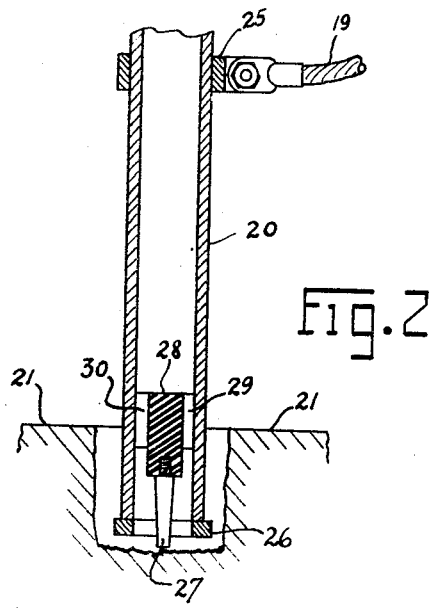
Malcolm S. Clark
INVENTOR
BY Peter M. Boesen
ATTORNEY Patented Jan. 19, 1943

2,308,860

UNITED STATES PATENT OFFICE 2,308,860

MEANS OF DRILLING ROCK, CONCRETE, AND THE LIKE

Malcolm S. Clark, Warren, Ohio

Application November 23, 1940, Serial No. 366,792

3 Claims. (Cl. 255—1)

This invention relates to a new and useful means of drilling rock, concrete, and the like, and more particularly to an apparatus utilizing the high temperature of the electric arc together with the low heat conductivity of the material to be drilled to flash heat the surface to be drilled thereby causing the surface material to expand and break up by thermal action.

The common method of drilling in rock and concrete always depends upon direct mechanical action in which a hardened steel drill-bit is actuated by a pneumatic hammer or by any other hammering means. The drill-bit is usually rotated and the blows struck on the end of same will cause the sharp bit to dig into the material to be drilled. By slowly rotating the bit between each blow chips are produced and a grinding or abrasive action takes place which powderizes the small chips into a powder which is often removed by water. Such rock drilling requires a great amount of energy as well as expensive tools and machinery in the form of compressors, etc., and it is also exceedingly noisy and often a dangerous operation to the operator who will often contract silicosis from the rock dust. It is furthermore an exceedingly slow and laborious type of operation which increases the cost of tunnels, mining, foundations, etc., to a large extent.

The present invention eliminates all the disadvantages of the older method of rock drilling and introduces an entirely new concept in this field. It utilizes the high temperature of the electric arc in a most unique manner, but it does not attempt to melt the materials to be drilled. The action depends upon the physical characteristics of the material to be drilled. In the first place such materials as rocks of various types, concrete, etc., have a relatively high thermal expansion coefficient. Secondly these materials have a very low heat conductivity. As an example may be mentioned that the heat conductivity of aluminum at 600 degrees centigrade is about 1.0 while the heat conductivity of granite at the same temperature is about .004. In other words, the heat conductivity of aluminum at this temperature is 250 times that of granite. In the present invention, this low heat conductivity of rock materials is effectively utilized and taken advantage of to make quick and efficient drilling possible. The principle of the invention rests upon the heat conductivity of the material which makes it possible by means of the high temperature of the electric arc to quickly heat the surface to be drilled in, thus establishing such a high temperature gradient near the surface of the material to be drilled that the surface layers will expand greatly as compared to the much cooler layers a short distance away. This exceedingly rapid expansion of the surface layers of the material will thus make same break up and flake off and powderize at an exceedingly rapid rate. It is thus possible, without any excessive use of power, to rapidly drill holes of various diameters in such materials.

An important object of the invention is, therefore, to provide an electric rock drill utilizing an electric arc of high voltage and high frequency to produce holes in rock and concrete silently, quickly and efficiently at a low cost and without any danger to the operator. Still another object of my invention is to provide an electric rock drill of such simple construction that it can be plugged into any suitable electric power supply and used to drill holes of small or large diameter in concrete or brick walls, floors, foundations, etc. A further object of the invention is to provide a means of rock drilling which will reduce the cost of mining, tunnels, and other excavating and digging operations and also to reduce the hazards connected with same. Other objects and advantages of the invention will be apparent during the course of the following description.

In the accompanying drawing, forming a part of this specification, and in which like numerals are employed to designate like parts throughout the same:

Figure 1 is a schematic diagram of an electric circuit suitable for use with and embodying my invention, and, Figure 2 shows a cross section of a rock drill.

In the drawing, wherein for the purpose of illustration, is shown a preferred and simplified embodiment of my invention, the numerals 5 and 6 designate the power leads connecting to a source of electric power and feeding the transformer 7 and through leads 8 and 9 providing operating energy to the timer 10. The secondary leads 11 and 12 of the transformer 7 connect to the condenser 13 with lead 14 connecting to the timer 10. Another lead 15 connects from lead 11 to one electrode of the mercury vapor tube 16. A lead 17 connects lead 12 to the ground 18 and lead 19 connects the other electrode to the mercury vapor tube 16 of the rock drill 20 working on the grounded surface 21. The mercury vapor tube 16 has three control grids or electrodes connected to the timer 10 by leads 22, 23 and 24.

Referring to Figure 2, the rock drill 20 is a metal tube to which is clamped the lead 19 and electrically connected to same through the clamp 25. At the lower end of the metal tube 20 is placed a tungsten electrode 26. A spacer plug 27 is tapped into the insulator 28 which is fastened inside on tube 20 and which has air channels 29 and 30.

The operation of my invention is as follows:

The power source connected to leads 5 and 6 energize the transformer 7 which charges condenser 13 to a high potential. The mercury vapor tube 16 is controlled by the timer 10 in such a manner as to prevent discharge of condenser 13 until a certain predetermined voltage has been reached. When this voltage is reached the tube 16 is ionized and acts as a switch, closing the circuit from condenser 13 through lead 15, lead 19, rock drill 20, grounded surface 21, ground 18 and lead 17. The spacer 27 holds the electrode 26 at the given distance from the surface 21 and the discharge of the condenser 13 at high voltage will cause a spark to appear between electrode 26 and the surface 21. The resistance of the circuit is very low and by arranging to use a condenser 13 of sufficient capacity a heavy discharge current is produced having a very steep characteristic. Due to the rapidity of the discharge and following steep characteristic of the current, the effect is identical with that of a high frequency current. The stored up energy of the condenser 13 must of necessity be dissipated in the discharge circuit. The mercury vapor discharge tube 16 is designed so as to work very efficiently without any appreciable loss of energy during the discharge. The rest of the circuit is of very low resistance and little energy will thus be dissipated except in the arc where the greatest resistance appears. The high temperature of the arc, combined with the skin effect and high frequency discharge current acts to heat the first layer of the surface 21 to a very high temperature while the immediately underlying layers of material remain at a much lower temperature due to the exceedingly short period of the discharge. The high expansion of the surface layer will, therefore, make the same crumble and powderize and the released material may be removed by suction through tube 20.

The spacer 27 is arranged so as to give a suitable arcing distance and the electrode 26 extends slightly outside the tube 20 thereby producing a somewhat larger hole than the diameter of tube 20 and preventing arcing from appearing between the tube 20 and the surface 21 as the hole deepens. The above description covered one discharge cycle of the operation after which the condenser 13 is again charged and the cycle repeats itself automatically.

It is to be understood that the form of my invention herewith shown and described is to be taken as a preferred example of the same, and that various changes in the shape, size, and arrangement of parts may be resorted to, without departing from the spirit of my invention or the scope of the subjoined claims.

Having thus described my invention, I claim:

1. A rock drill of the character described, comprising a high frequency discharge circuit including a high voltage transformer and a grid control mercury vapor discharge tube, one side of said high voltage condenser being connected to ground, the other side of the condenser being connected through the discharge tube; a rock drilling arc electrode connected in series with said grid control mercury vapor tube and with the grounded surface to be drilled; an insulated spacer placed between the end of said rock drilling arc electrode and the surface to be drilled and power and timing means whereby said high voltage condenser may be charged and discharged through said mercury vapor tube, thereby producing an arc between said rock drilling electrode and the surface to be drilled.

2. A rock drilling electrode of the character described comprising a tubular body member of an electrically conductive material; an electrode tip member of an arc resisting material such as tungsten, said electrode tip extending outside the periphery of the tubular body portion and being fastened to the end of same; an insulator being fastened inside to said tubular body member and having air channels in the longitudinal direction of the tube and a spacer member fastened to said insulator and protruding through the end of the tube and extending to a given distance away from the electrode member.

3. A rock drilling electrode of the character described comprising a tubular body member of an electrically conductive material; an electrode tip member of an arc resisting material, said electrode tip member being in the shape of a ring fastened to the end of said tubular member and extending slightly outside the periphery of same; an insulator member being fastened inside said tubular member near the end carrying said electrode tip member, said insulator having air channels in the longitudinal direction of the tube, and a spacer member fastened to said insulator and protruding through the end of the tubular member and extending to a given distance away from the electrode member.

MALCOLM S. CLARK.